(12) United States Patent  
Moribe et al.

(10) Patent No.: US 11,407,231 B2  
(45) Date of Patent: Aug. 9, 2022

(54) IMAGE PROCESSING METHOD

(71) Applicant: CANON KABUSHIKI KAISHA, Tokyo (JP)

(72) Inventors: Shoei Moribe, Kawasaki (JP); Yumi Yanai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 16/843,151

(22) Filed: Apr. 8, 2020

(65) Prior Publication Data

US 2020/0324555 A1 Oct. 15, 2020

(30) Foreign Application Priority Data

Apr. 15, 2019 (JP) .............................. JP2019-077339

(51) Int. Cl.
| | |
|---|---|
| *B41J 2/21* | (2006.01) |
| *B41J 2/205* | (2006.01) |
| *C09D 11/322* | (2014.01) |
| *G06K 15/10* | (2006.01) |
| *C09D 11/40* | (2014.01) |
| *G06K 15/00* | (2006.01) |

(Continued)

(52) U.S. Cl.
CPC .............. *B41J 2/211* (2013.01); *B41J 2/2054* (2013.01); *C09D 11/322* (2013.01); *C09D 11/328* (2013.01); *C09D 11/40* (2013.01); *G06K 15/102* (2013.01); *G06K 15/107* (2013.01); *G06K 15/1878* (2013.01); *G06K 15/407* (2013.01)

(58) Field of Classification Search
CPC ....... B41J 2/211; B41J 2/2054; C09D 11/322; C09D 11/328; C09D 11/40; G06K 15/102; G06K 15/107; G06K 15/1878; G06K 15/407
See application file for complete search history.

(56) References Cited

U.S. PATENT DOCUMENTS

| | | |
|---|---|---|
| 9,592,689 B2 | 3/2017 | Yanai |
| 9,623,670 B2 | 4/2017 | Kagawa |

(Continued)

FOREIGN PATENT DOCUMENTS

JP 2016-112892 6/2016

OTHER PUBLICATIONS

U.S. Appl. No. 16/843,412, filed Apr. 8, 2020 by Shoei Moribe et al.

(Continued)

*Primary Examiner* — Yaovi M Ameh  
(74) *Attorney, Agent, or Firm* — Venable LLP

(57) ABSTRACT

A surface tension difference between a first ink and a third ink is smaller than a surface tension difference between the first ink and a second ink. A first gradation value for the first ink is quantized to generate a first quantized value, a second gradation value for the second ink is quantized to generate a second quantized value, and a third gradation value for the third ink is quantized to generate a third quantized value. The above quantization processing is performed such that, in a predetermined pixel region, the number of pixels for each of which the second quantized value and the third quantized value both indicate printing is greater than the number of pixels for each of which the first quantized value and the third quantized value both indicate printing.

19 Claims, 12 Drawing Sheets

(51) Int. Cl.
 *C09D 11/328* (2014.01)
 *G06K 15/02* (2006.01)

(56) References Cited

U.S. PATENT DOCUMENTS

| | | |
|---|---|---|
| 9,636,937 B2 | 5/2017 | Ikeda |
| 9,649,839 B2 | 5/2017 | Ishikawa |
| 9,661,181 B2 | 5/2017 | Kato |
| 9,704,074 B2 | 7/2017 | Kato |
| 9,715,636 B2 | 7/2017 | Ikeda |
| 9,815,275 B2 | 11/2017 | Yanai |
| 9,965,842 B2 | 5/2018 | Suwa |
| 10,013,626 B2 | 7/2018 | Hori |
| 10,546,191 B2 | 1/2020 | Tanaka |
| 2016/0167414 A1* | 6/2016 | Yanai .................. H04N 1/4052 347/14 |
| 2017/0120577 A1* | 5/2017 | Yanai .................. H04N 1/4052 |
| 2020/0042840 A1 | 2/2020 | Doi |
| 2020/0045208 A1 | 2/2020 | Doi |

OTHER PUBLICATIONS

U.S. Appl. No. 16/843,304, filed Apr. 8, 2020 by Shoei Moribe et al.

\* cited by examiner

IMAGE PROCESSING METHOD

BACKGROUND OF THE INVENTION

Field of the Invention

The present invention relates to an image processing method for printing an image on a print medium by performing quantization processing.

Description of the Related Art

A pigment ink and a dye ink can be given as inks used in an inkjet printing apparatus. Although the pigment ink has better light resistance and water resistance than the dye ink, the pigment ink has a problem of poor rub-fastness because the color material tends to remain on a surface of a print medium.

Japanese Patent Laid-Open No. 2016-112892 discloses a quantization processing method for improving the rub-fastness of an image in an inkjet printing apparatus using a pigment ink (first color) and a dye ink (second color). According to Japanese Patent Laid-Open No. 2016-112892, quantization processing for the first color is performed by comparing a gradation value of the first color with a threshold stored in a threshold matrix and quantization processing for the second color is performed by comparing a gradation value of the second color with a value obtained by offsetting the threshold based on the gradation value of the first color. In this specification, such quantization processing is hereafter referred to as inter-color processing.

In the case where the inter-color processing is used, a region of highlight to an intermediate gray scale level can be printed with dots of inks of multiple colors arranged with minimum possible overlapping on the printing medium. Moreover, in the case where a threshold matrix with blue noise characteristics is used, the dispersiveness of an ink color set as the first color among the multiple ink colors can be made particularly high. In Japanese Patent Laid-Open No. 2016-112892, such characteristics of the inter-color processing are used. Specifically, a pigment ink with high surface tension is set as the first color and a dye ink with low surface tension is set as the second color to suppress a decrease in the rub-fastness which occurs with overlapping of the pigment ink.

However, in recent years, more and more printers have been employing a configuration in which pigment inks are used not only as the black ink but also as some of the color inks. In this case, in a high density portion of an intermediate or higher gray scale level, a situation where inks with high surface tension are printed to overlap each other occurs even if the inter-color processing is performed in the method of Japanese Patent Laid-Open No. 2016-112892 and there is a concern of a decrease in rub-fastness.

SUMMARY OF THE INVENTION

The present invention has been made to solve the aforementioned problems. Accordingly, an object of the invention is to output an image with excellent rub-fastness in an inkjet printing method configured to print an image by using multiple inks varying in surface tension.

In a first aspect of the present invention, there is provided an image processing method comprising: an obtaining step of obtaining a first gradation value for a first coloring material, a second gradation value for a second coloring material, and a third gradation value for a third coloring material for each pixel; and a generation step of generating a first quantized value indicating applying or non-applying of the first coloring material by quantizing the first gradation value, generating a second quantized value indicating applying or non-applying of the second coloring material by quantizing the second gradation value, and generating a third quantized value indicating applying or non-applying of the third coloring material by quantizing the third gradation value, for each pixel, the image processing method including performing image processing for printing an image on a print medium by using an applying unit configured to apply the first coloring material according to the first quantized value, apply the second coloring material according to the second quantized value, and apply the third coloring material according to the third quantized value, wherein a surface tension difference between the first coloring material and the third coloring material is smaller than a surface tension difference between the first coloring material and the second coloring material, and wherein in a case where the same first gradation values, the same second gradation values, and the same third gradation values for a plurality of pixels included in a predetermined pixel region are obtained uniformly in the obtaining step, the generation unit generates the first quantized values, the second quantized values, and the third quantized values such that, in the predetermined pixel region, the number of pixels for each of which the second quantized value indicates applying the second coloring material and the third quantized value indicates applying the third coloring material is greater than the number of pixels for each of which the first quantized value indicates applying the first coloring material and the third quantized value indicates applying the third coloring material.

In a second aspect of the present invention, there is provided an image processing method comprising a generation step of generating a first quantized value by comparing a first gradation value for a first coloring material with a threshold for the pixel in a threshold matrix, generating a second quantized value by quantizing a second gradation value for a second coloring material, and generating a third quantized value by quantizing a third gradation value for a third coloring material, for each pixel, the image processing method including performing image processing for printing an image on a print medium by using an applying unit configured to apply the first coloring material according to the first quantized value, apply the second coloring material according to the second quantized value, and apply the third coloring material according to the third quantized value, wherein a surface tension difference between the first coloring material and the third coloring material is smaller than a surface tension difference between the first coloring material and the second coloring material, in the generation step, the second quantized value is generated based on the first gradation value, the second gradation value, and the threshold used in the comparison with the first gradation value, and the third quantized value is generated based on the first gradation value, the third gradation value, and the threshold used in the comparison with the first gradation value.

Further features of the present invention will become apparent from the following description of exemplary embodiments with reference to the attached drawings.

BRIEF DESCRIPTION OF THE DRAWINGS

FIG. 10 is a diagram showing the relationship of FIGS. 10A and 10B;

DESCRIPTION OF THE EMBODIMENTS

First Embodiment (Apparatus Configuration)

Figure 1A:
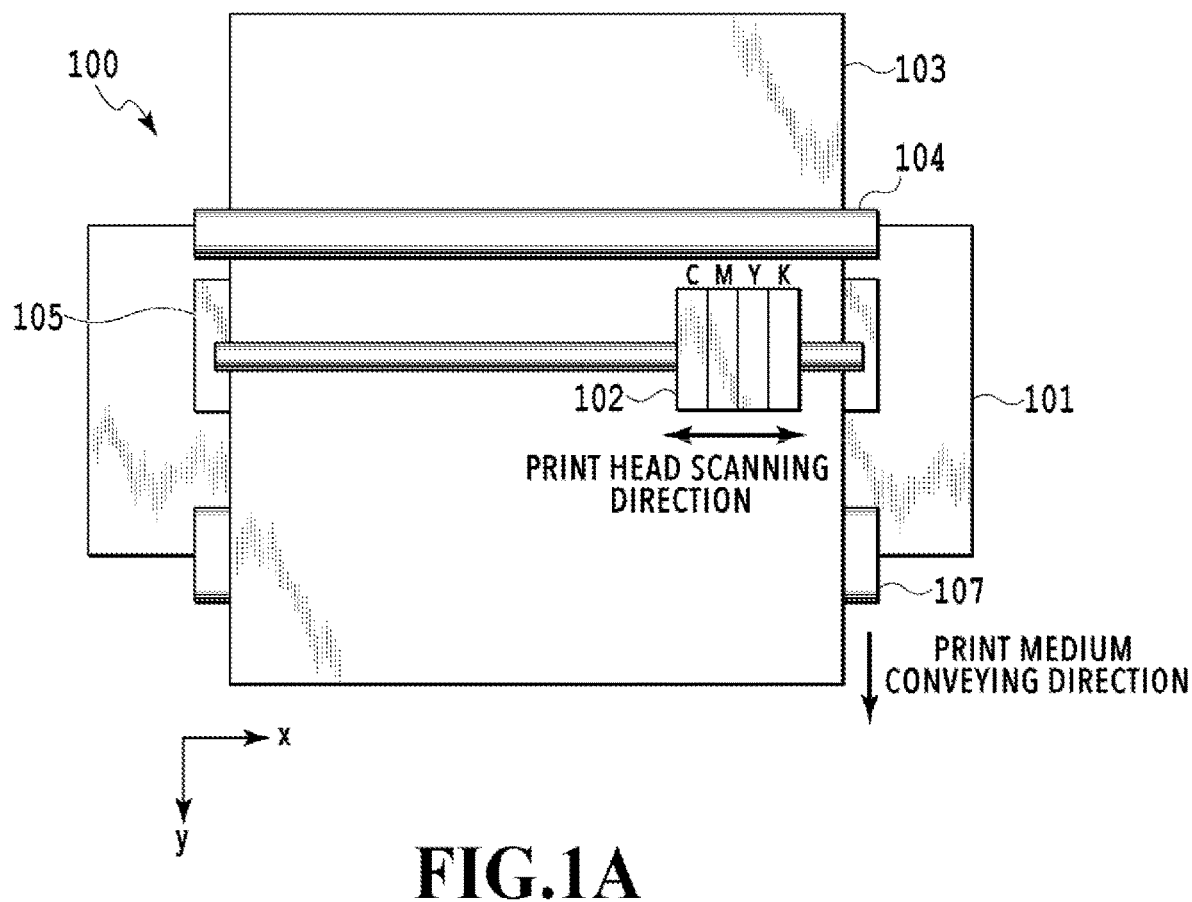
FIGS. 1A and 1B are schematic configuration diagrams of an inkjet printing apparatus and a print head.
Figure 1B:
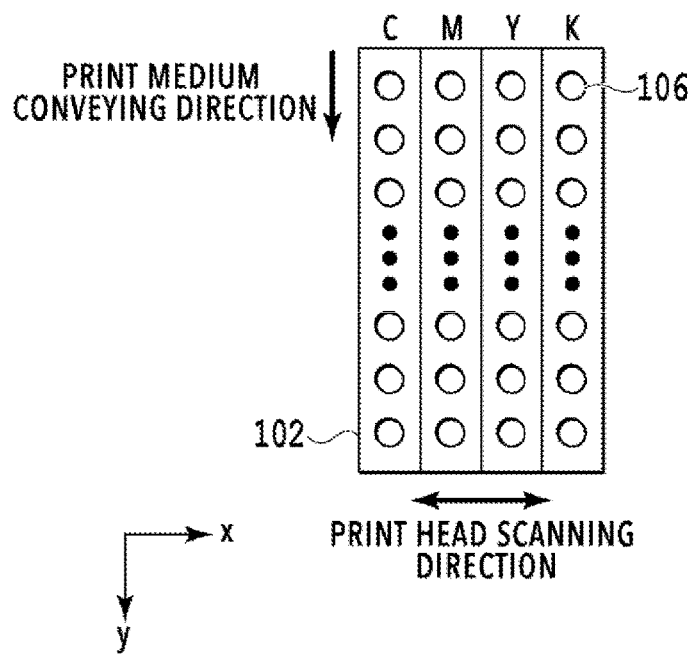

FIGS. 1A and 1B are schematic configuration diagrams of an inkjet printing apparatus 100 (hereafter also simply referred to as printing apparatus 100) usable in the present invention and a print head 102 mountable in the printing apparatus 100. The printing apparatus 100 of the embodiment is a serial inkjet printing apparatus and the print head 102 is capable of reciprocating in an x-direction in FIGS. 1A and 1B.

In the print head 102, nozzle rows which eject inks of cyan (C), magenta (M), yellow (Y), and black (K), respectively, are arranged in the x-direction and, in each nozzle row, nozzles 106 which eject the ink are arranged in a y-direction. In FIGS. 1A and 1B, although the nozzles which eject the ink of the same color are arranged in one row in the y-direction in each nozzle row, the nozzle row of each color may include multiple nozzle rows which eject the ink of the same color. In the embodiment, the inks of magenta (M), yellow (Y), and black (K) among the inks of four colors of cyan (C), magenta (M), yellow (Y), and black (K) are pigment inks with relatively high surface tension and the ink of cyan (C) is a dye ink with relatively low surface tension.

A print medium 103 in a region in which the print head 102 performs printing is held between a pair of conveyance rollers 104 and a pair of discharge rollers 107 and is maintained to be flat and smooth. Moreover, a platen 105 is arranged at a position facing an ejection port surface of the print head 102 and supports the print medium 103 subjected to printing from the back side.

In the aforementioned configuration, the print head 102 moves in the x-direction while ejecting the inks according to print data to perform one print scanning operation. In the case where such one print scanning operation is performed, the conveyance rollers 104 and the discharge rollers 107 turn and convey the print medium 103 in the y-direction by a distance corresponding to a print width of the print head 102. Then, such a print scanning operation by the print head 102 and such a conveyance operation of the print medium 103 are alternately repeated and an image is printed on the print medium 103 step by step.

(System Configuration)

Figure 2:
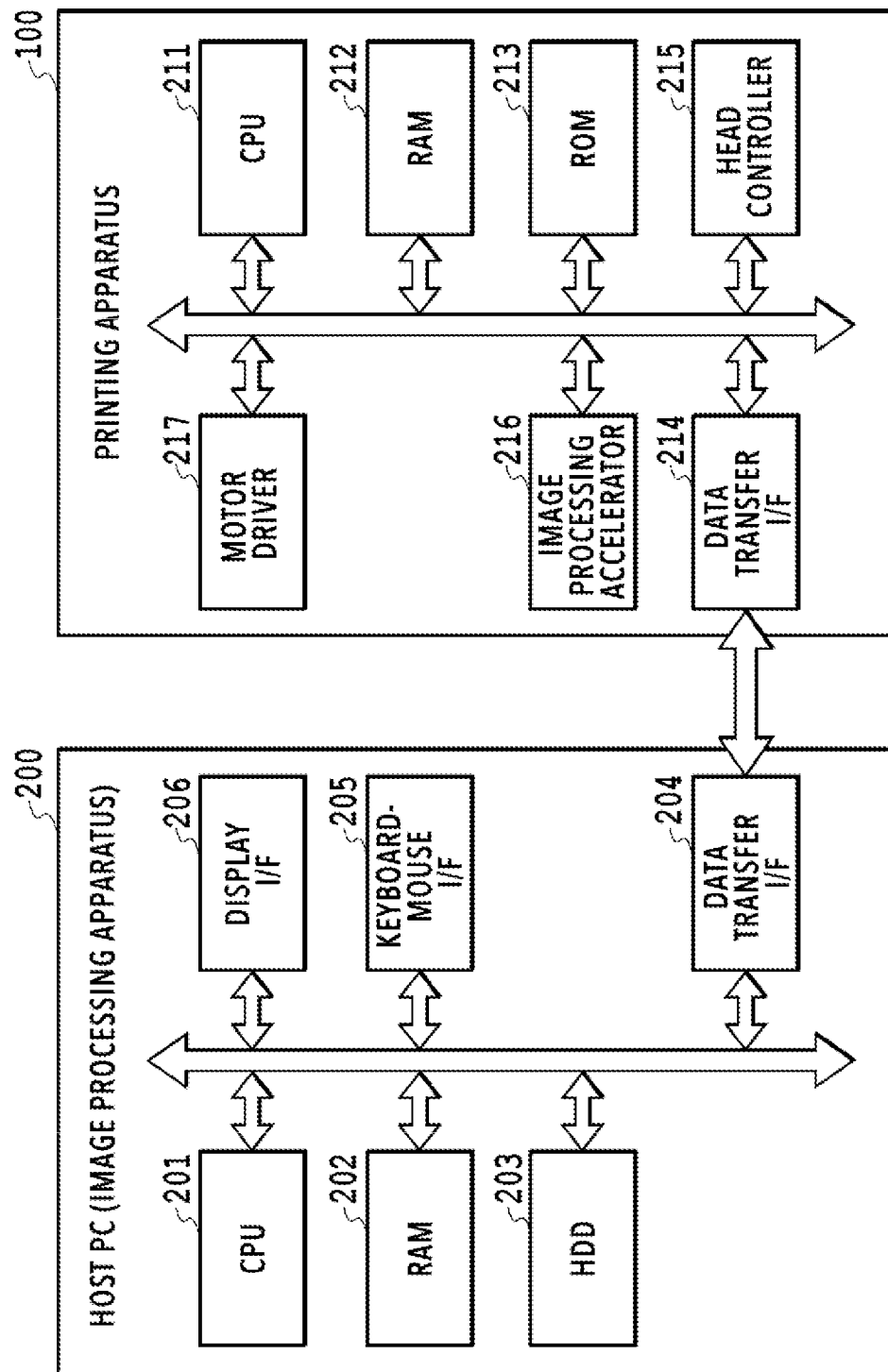
FIG. 2 is a block diagram illustrating a configuration of control of an inkjet printing system.

FIG. 2 is a block diagram illustrating a configuration of control of an inkjet printing system usable in the present invention. The inkjet printing system in the embodiment includes the printing apparatus 100 and an image processing apparatus 200 such as a host PC. Image data subjected to predetermined image processing in the image processing apparatus 200 is sent to the printing apparatus 100 and is subjected to printing processing in the print head 102 (not illustrated in FIG. 2).

In the image processing apparatus 200, a CPU 201 controls the entire image processing apparatus 200 according to a program stored in a HDD 203 by using a RAM 202 as a work area. The RAM 202 is a volatile memory unit and temporarily stores programs and data. The HDD 203 is a non-volatile memory unit and also stores programs and data. The CPU 201 performs the predetermined image processing on the image data to be printed by the printing apparatus 100 and then sends the image data to the printing apparatus 100 via a data transfer I/F 204.

The data transfer I/F 204 is an I/F for controlling exchange of data with the printing apparatus 100. USB, IEEE1394, LAN, or the like can be used as a connection method. A keyboard-mouse I/F 205 is an I/F for controlling not-illustrated human interface devices (HIDs) such as a keyboard and a mouse. A user inputs various settings and commands by using the keyboard and the mouse and the keyboard-mouse I/F 205 sends the inputted settings and commands to the CPU 201. A display I/F 206 is an I/F for controlling a display screen in a not-illustrated display connected to the image processing apparatus 200. The user can check various pieces of information through screens displayed on the display by the CPU 201 via the display I/F 206.

Meanwhile, in the printing apparatus 100, a CPU 211 controls the entire printing apparatus 100 according to a program stored in a ROM 213 by using a RAM 212 as a work area. The RAM 212 is a volatile memory unit and temporarily stores programs and data. The ROM 213 is a non-volatile memory unit and also stores programs and data.

A data transfer I/F 214 controls exchange of data with the image processing apparatus 200. An image processing accelerator 216 is hardware capable of executing image processing at higher speed than the CPU 211. The image processing accelerator 216 is activated in the case where the CPU 211 writes parameters necessary for the image processing and the image data received from the data transfer I/F 214 into a predetermined address of the RAM 212. Then, the image processing accelerator 216 performs the predetermined image processing on the image data and generates print data for driving the print head 102.

A motor driver 217 is a driver for driving various motors in the printing apparatus 100 such as a carriage motor configured to move a carriage in which the print head 102 is mounted in the x-direction and a conveyance motor configured to turn the conveyance rollers 104 and the discharge rollers 107. A head controller 215 is a driver for driving the print head 102 according to the print data.

In the case where the image processing accelerator 216 generates the print data, the CPU 211 drives the various motors via the motor driver 217 and causes the print head 102 to perform a printing operation according to the print data via the head controller 215.

Note that, in the embodiment, the image processing accelerator 216 is not an essential element. In the case where the CPU 211 has a sufficient processing performance, the CPU 211 may execute the predetermined image processing.

(Image Processing Flow)

Figure 3:
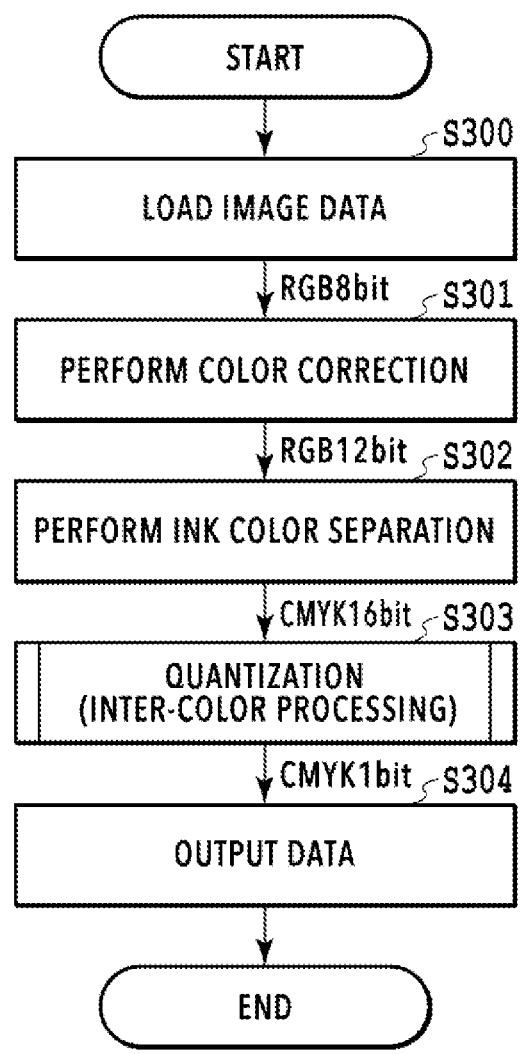
FIG. 3 is a flowchart for explaining image processing.

FIG. 3 is a flowchart for explaining the image processing executed by the CPU 201 of the image processing apparatus 200. This processing is started in the case where the user inputs a print command for printing a predetermined image.

In the case where this processing is started, in S300, the CPU 201 loads the image data to be printed into the RAM 202. In this case, the loaded image data is data formed of multiple pixels each having brightness values of red (R), green (G), and blue (B) expressed in 8-bits (256 gray scale levels). Hereafter, image data which is a collection of pixels formed of multiple elements (RGB) as described above is referred to as, for example, "RGB data."

In S301, the CPU 201 performs color correction processing on the RGB data loaded in S300. The color correction processing is processing in which a color space standardized in sRGB or the like is associated with a color space which can be expressed by the printing apparatus 100. Specifically, the CPU 201 converts the 8-bit RGB data to 12-bit R'G'B' data by referring to a three-dimensional lookup table stored in the HDD 203.

In S302, the CPU 201 performs ink color separation processing on the R'G'B' data obtained in S301. The ink color separation processing is processing in which the R'G'B' data indicating the brightness values is converted to image data indicating gradation values corresponding to the respective ink colors used in the printing apparatus 100. Specifically, the CPU 201 converts the 12-bit R'G'B' data to 16-bit CMYK data indicating gradation values of cyan (C), magenta (M), yellow (Y), and black (K) by referring to a three-dimensional lookup table. The ink color separation processing generates 16-bit gray scale data for four channels.

In S303, the CPU 201 performs quantization processing on the 16-bit CMYK data. In the embodiment, the 16-bit CMYK data is quantized into binary 1-bit data indicating printing (1) or non-printing (0) for each pixel. Details of the quantization processing are described later.

In S304, the CPU 201 outputs 1-bit data for each color obtained by the quantization processing in S303 to the printing apparatus 100 via the data transfer I/F 204. The processing is thus completed.

Note that, although description is given above of the mode in which the image processing apparatus 200 performs all of the steps described in FIG. 3, the image processing accelerator 216 (see FIG. 2) of the printing apparatus 100 may perform some or all of the steps described in FIG. 3.

(Details of Quantization Processing)

Figure 4:
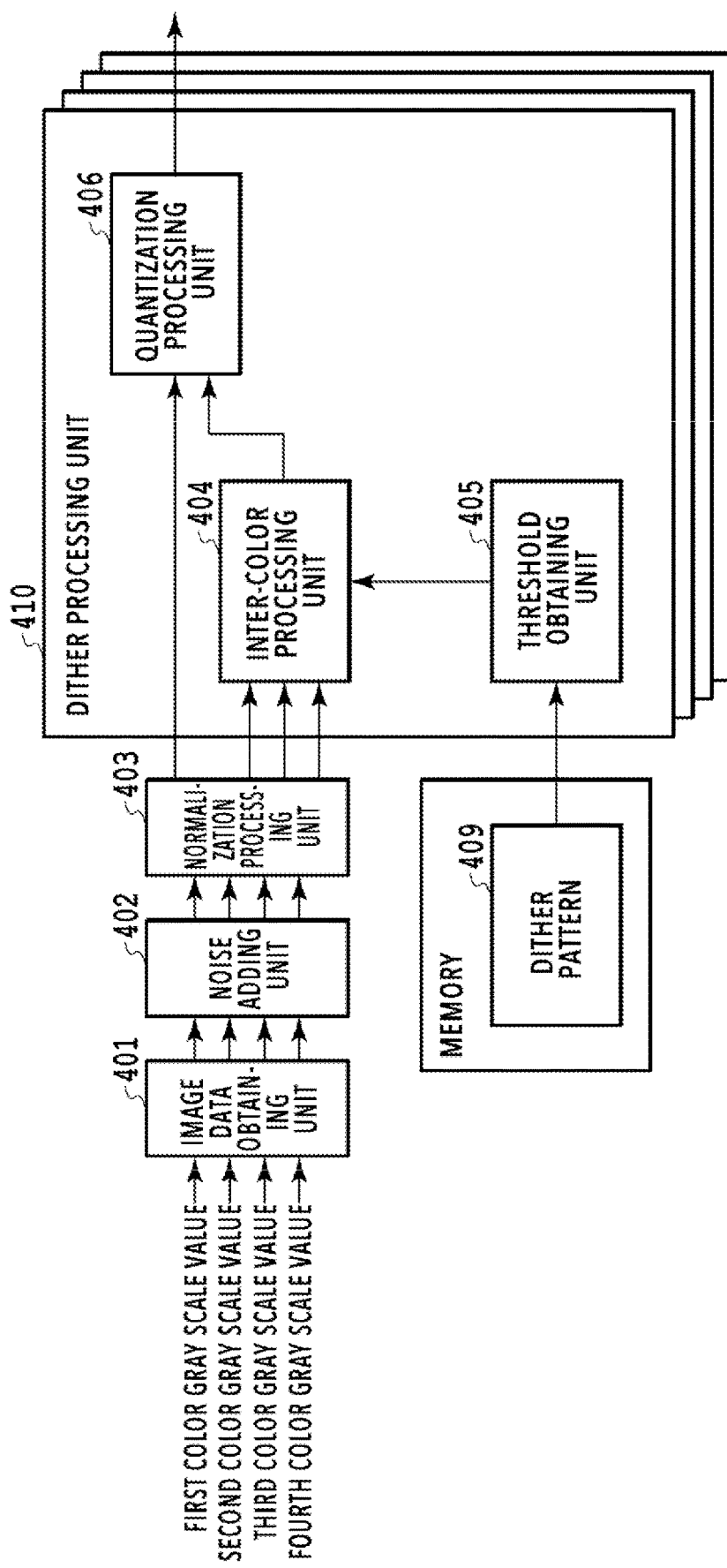
FIG. 4 is a block diagram for explaining details of quantization processing.

FIG. 4 is a block diagram for explaining details of the quantization processing executed in S303 of FIG. 3. In the quantization processing of the embodiment, first, processing relating to the gradation values of each inputted pixel is performed, then processing relating to a threshold is performed, and lastly quantization processing using a dither method is performed. The series of these processes is performed in parallel for all colors (all channels). The quantization processing for a certain color (channel) is described in detail with reference to FIG. 4.

An image data obtaining unit 401 obtains 16-bit gradation values of the respective ink colors for each pixel. FIG. 4 illustrates a state where the 16-bit gradation values of the respective first to fourth colors are inputted.

A noise adding unit 402 adds predetermined noise to the 16-bit gradation values. Adding the noise can avoid a state where the same pattern is consecutively printed and suppress generation of stripes and textures also in the case where the pixels having the gradation values of the same level are consecutively arranged. In the noise adding unit 402, noise generated by using a code indicated by a predetermined random table, a fixed intensity, and a fluctuating intensity corresponding to an input value is added to the gradation values for each pixel. In this case, the random table is a table for setting positive or negative of the noise and positive, zero, or negative is set for each pixel position. In the embodiment, there may be eight random tables at maximum and the table size of each table can be set to any size. The fixed intensity indicates the intensity of the noise amount and the magnitude of the noise is determined depending on this intensity. In the embodiment, an optimal random table and an optimal fixed intensity are set for each print mode depending on the graininess of the image, degrees of stripes and texture, and the like and the noise amount is thereby adjusted to an appropriate amount.

A normalization processing unit 403 normalizes the 16-bit gradation values to which the noise is added into a range of 12 bits. Specifically, the normalization processing unit 403 normalizes the 65535-level gradation values expressed in 16 bits into 4096-level gradation values expressed in 12 bits.

The aforementioned processing of the image data obtaining unit 401 to the normalization processing unit 403 is performed in parallel for all colors (all channels). Then, the 12-bit data for the four colors indicating the gradation values of cyan, magenta, yellow, and black is inputted into dither processing units 410 for the respective four channels.

In each dither processing unit 410, the gradation value of a processing target color to be quantified is sent to a quantization processing unit 406 as it is as a processing target gradation value. Meanwhile, the gradation values of the colors other than the processing target color are inputted into an inter-color processing unit 404 as reference gradation values. The inter-color processing unit 404 performs predetermined processing on a threshold obtained by a threshold obtaining unit 405 based on the reference gradation values to determine a final threshold and provides the final threshold to the quantization processing unit 406. The quantization processing unit 406 compares the processing target gradation value with the threshold received from the inter-color processing unit 404 to generate a quantized value indicating printing (1) or non-printing (0).

The threshold obtaining unit 405 selects one threshold matrix corresponding to the print mode from multiple dither patterns 409 stored in a memory such as the ROM and obtains a threshold for a pixel position of the processing target gradation value. In the embodiment, each dither pattern 409 is a threshold matrix formed by arranging thresholds of 0 to 4095 such that the threshold matrix has blue noise characteristics. Each dither pattern 409 may have any size and shape such as 512×512 pixels, 256×256 pixels, and 512×256 pixels. Specifically, multiple threshold matrices varying in size and shape as described above are stored in advance in the memory and the threshold obtaining unit 405 selects the threshold matrix corresponding to the print mode from these threshold matrices. Then, the threshold obtaining unit 405 selects the threshold Dth(x, y) for the pixel position (x, y) of the processing target gradation value from multiple thresholds arranged in the selected threshold matrix and provides the threshold Dth(x, y) to the inter-color processing unit.

(General Inter-Color Processing)

In this section, first, description is given of general inter-color processing as disclosed in Japanese Patent Laid-Open No. 2016-112892.

Figure 6:
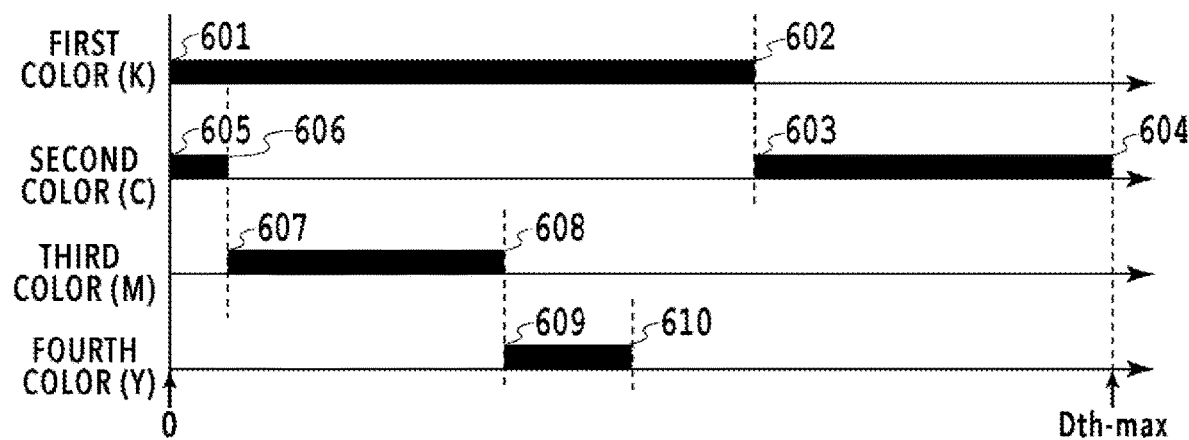
FIG. 6 is a graph indicating a range of thresholds according to which a determination result of printing is given.

In the example of FIG. 6, a situation where there are thresholds according to which determination of printing (1)

is given to two colors out of the first to fourth colors and inks of two colors overlap each other to form on a print medium occurs. However, for example, in the case where the value of In1+In2+In3+In4 is smaller than Dth_max, there are no thresholds according to which determination of printing (1) is given to two or more colors and all ink colors are printed at exclusive pixel positions. Accordingly, in the case where a matrix with blue noise characteristics is used as the threshold matrix, it is possible to arrange dots in a highly-dispersed manner while avoiding overlapping of dots of different colors.

As described above, in the general inter-color processing, although the same threshold matrix is used, the quantization threshold Dth' unique to each color is obtained by using each other's gradation values as the offset values. Then, the processing of quantization to printing (1) or non-printing (0) is performed by using the newly-obtained quantization threshold Dth' and this can minimize the overlapping of dots of inks of multiple colors on the print medium.

In Japanese Patent Laid-Open No. 2016-112892, black with high surface tension is set as the first color from the viewpoint that, in the case where the inter-color processing is performed by using the threshold matrix with blue noise characteristics, the dispersiveness of the dots of the first color is the highest followed by the second color, the third color, and the fourth color in this order. Specifically, setting the black ink with high surface tension as the first color reduces frequency of occurrence of the case where dots of the black ink come into contact with one another or overlap one another on the print medium and reduces unevenness on the print medium. As a result, the rub-fastness of the printed image is improved. Moreover, the black dots formed by the black ink have higher contrast to a white region of paper than the dots of the other colors and graininess thereof tends to be more obvious. Accordingly, setting the black ink as the first color can also reduce the graininess of the image.

However, in recent years, pigment inks with high surface tension are also used as color inks. In this case, even if the aforementioned inter-color processing is employed with the black ink set as the first color, frequency of contact or overlapping of inks with high surface tension increases and rub-fastness of the image may decrease in some cases in a region where the sum of the reference gradation values exceeds the threshold maximum value Dth_max.

For example, in FIG. 6, in the case where the first, third, and fourth colors are the inks with high surface tension and the ink of the second color is the ink with low surface tension, the inks with high surface tension are printed to overlap one another in regions 607 to 608 and 608 to 609. In this case, the inks with high surface tension form protruding portions on the surface of the print medium and an image with poor rub-fastness is formed. According to the studies of the present inventors, it is found that the higher the surface tension of inks are, and the smaller the surface tension difference between the inks is, the more likely that the combination of the inks form unevenness on the surface of the print medium and an image with poor rub-fastness is formed.

(Inter-Color Processing in Embodiment)

In light of the aforementioned matters, in the embodiment, the inter-color processing is performed such that, in the situation where inks of multiple colors are printed to overlap one another, the overlapping of inks occurs in a combination of inks with a maximum surface tension difference.

Figure 7A:
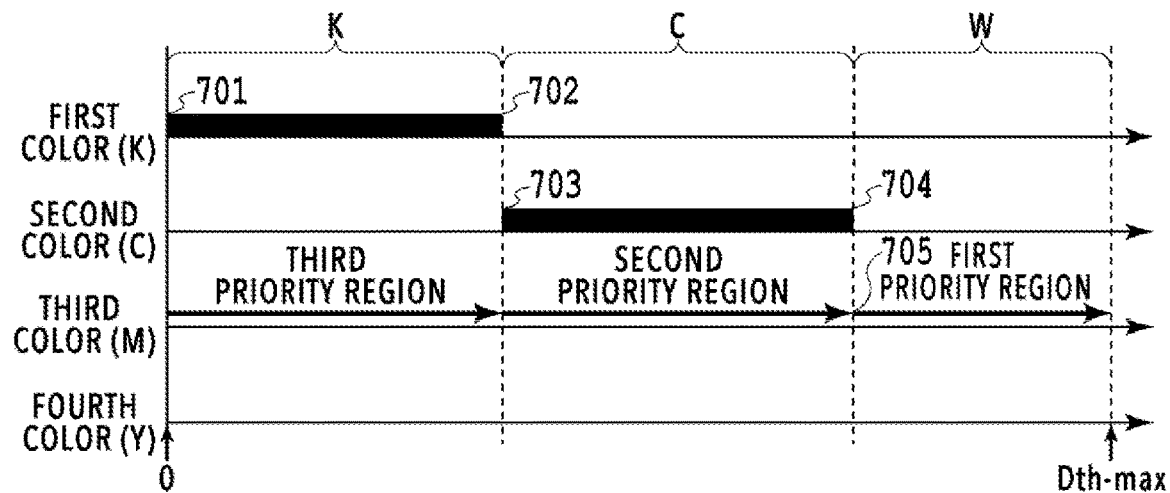
FIGS. 7A and 7B are graphs for explaining the inter-color processing in the embodiment.
Figure 7B:
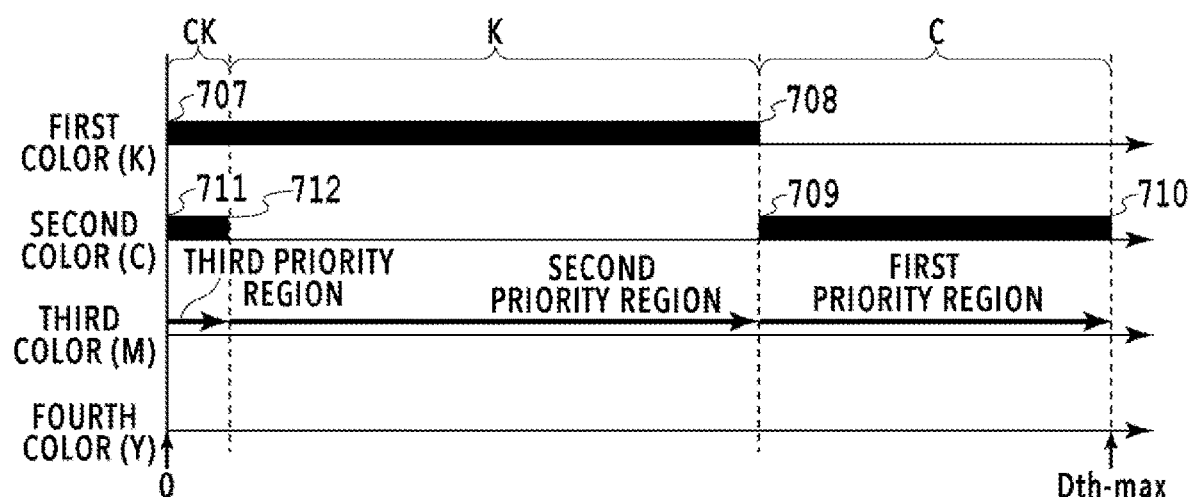

FIGS. 7A and 7B are graphs for explaining the inter-color processing in the embodiment. As in FIG. 6, the horizontal axis represents the range (0 to Dth_max) of values which the threshold Dth can take. FIGS. 7A and 7B illustrate a state where the same first gradation values In1, the same second gradation values In2, the same third gradation values In3, and the same fourth gradation values In4 of the first to fourth colors are uniformly inputted in a predetermined pixel region and the quantization processing is completed for the gradation value In1 of the first color and the gradation value In2 of the second color.

FIG. 7A illustrates the case of (In1+In2)<Dth_max. The threshold range (0 to Dth_max) is divided into a region (701 to 702) in which only the first color is set to printing (1), a region (703 to 704) in which only the second color is set to printing (1), and a region (705 to Dth_max) in which both colors are set to non-printing (0). Specifically, the print medium has, in a mixed manner, pixel regions in which the single-color dots of black being the first color are printed, pixel regions in which the single-color dots of cyan being the second color are printed, and pixel regions in which neither dots of black nor dots of cyan are printed. In other words, there are no overlapping dots of these two colors. Accordingly, the decrease in rub-fastness due to overlapping of dots does not occur.

Meanwhile, FIG. 7B illustrates the case of (In1+In2) >Dth_max. In this case, the threshold range (0 to Dth_max) is divided into a region (712 to 708) in which only the first color is set to printing (1), a region (709 to 710) in which only the second color is set to printing (1), and a region (711 to 712) in which both colors are set to printing (1). Specifically, the print medium has, in a mixed manner, pixel regions in which the single-color dots of black are printed, pixel regions in which single-color dots of cyan are printed, and pixel regions in which the overlapping dots of black and cyan are printed. Note that, since the difference in the surface tension between the black ink and the cyan ink used in the embodiment is large, there is little concern that the overlapping dots of these two colors form uneven portions on the print medium.

Next, assume the case where quantization for magenta being the third color and yellow being the fourth color is performed with the quantization for the first and second colors performed as described above. According to the studies of the present inventors, in view of the rub-fastness of the image, printing the magenta ink and the yellow ink with high surface tension while avoiding overlapping thereof with the other inks is the most preferable and printing the magenta ink and the yellow ink in a manner overlapping the cyan ink with low surface tension is the second most preferable. Specifically, in the case of FIG. 7A, a region (705 to Dth_max) in which the first and second colors are set to non-printing (0) is set as a first priority region suitable for setting the third color to printing (1). Then, a region (703 to 704) in which only cyan (second color) with low surface tension is set to printing (1) is set as a second priority region and a region (701 to 702) in which only black (first color) with high surface tension is set to printing (1) is set as a third priority region. Note that the third color is set to printing (1) in the second priority region in the case of (In1+In2+In3)>Dth_max. The third color is set to printing (1) only in the first priority region in the case of (In1+In2+In3)<Dth_max.

Meanwhile, in the case of FIG. 7B, since there is no region where the first and second colors are set to non-printing (0), a region (709 to 710) in which only cyan (second color) with low surface tension is set to printing (1) is set as the first priority region. Then, a region (712 to 708) in which only black (first color) with high surface tension is set to printing (1) is set as the second priority region and a region (711 to 712) in which the first and second colors are set to printing (1) is set as the third priority region. Note that the third color is set to printing (1) in the second priority region in the case of (In1+In3)>Dth_max. The third color is set to printing (1) only in the first priority region in the case of (In1+In3)<Dth_max.

Figure 8:
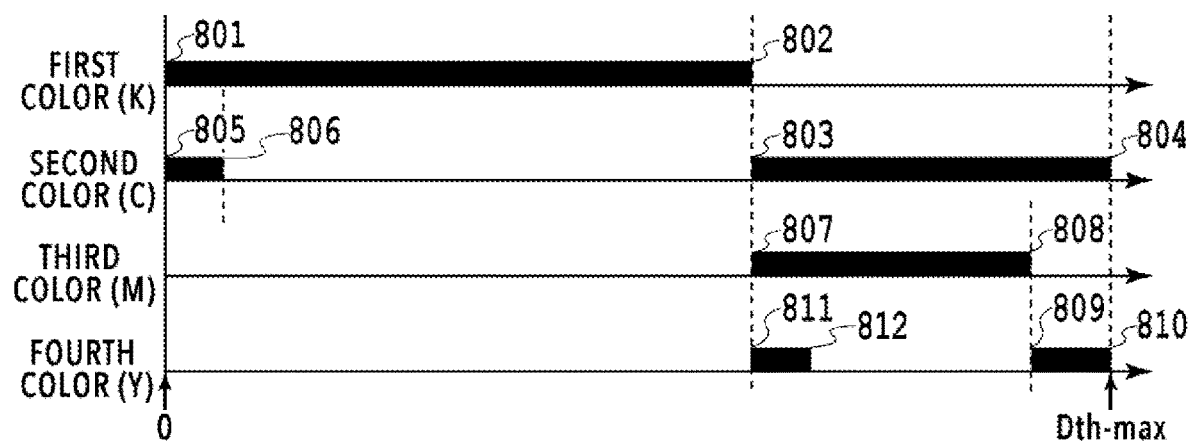
FIG. 8 is a graph illustrating results of quantization for first to fourth colors.

FIG. 8 illustrates a result of quantization of the third color which is magenta and the fourth color which is yellow, the quantization performed in the state where the first and second colors are subjected to the quantization processing as in FIG. 7B. A region (807 to 808) in which the third color is determined to be set to printing (1) is entirely included in the first priority region. Accordingly, all magenta dots are printed to overlap the cyan dots instead of the black dots.

The same applies to the fourth color. A region (809 to 810) in which only cyan (second color) with low surface tension is set to printing (1) is set as the first priority region and a region (807 to 808) in which the second and third colors are set to printing (1) is set as the second priority region. Then, a region (806 to 803) in which cyan (second color) with low surface tension is set to non-printing (0) and only the first color is set to printing (1) is set as the third priority region. FIG. 8 illustrates the case where yellow being the fourth color is set to printing (1) in the entire first priority region (809 to 810) and part (811 to 812) of the second priority region. For pixel positions where inks of multiple colors are set to printing (1) and overlap one another, cyan (second color) is always set to printing (1) in both of overlapping of inks of two colors and overlapping of inks of three colors in the entire threshold region.

As described above, in the inter-color processing of the embodiment, the same processing as the conventional inter-color processing is performed for the first and second colors. Then, for the third color and beyond, the offset value Ofs to be used in the inter-color processing is adjusted such that the threshold region in which the color is set to printing (1) is set according to the aforementioned order of priority.

Figure 5A:
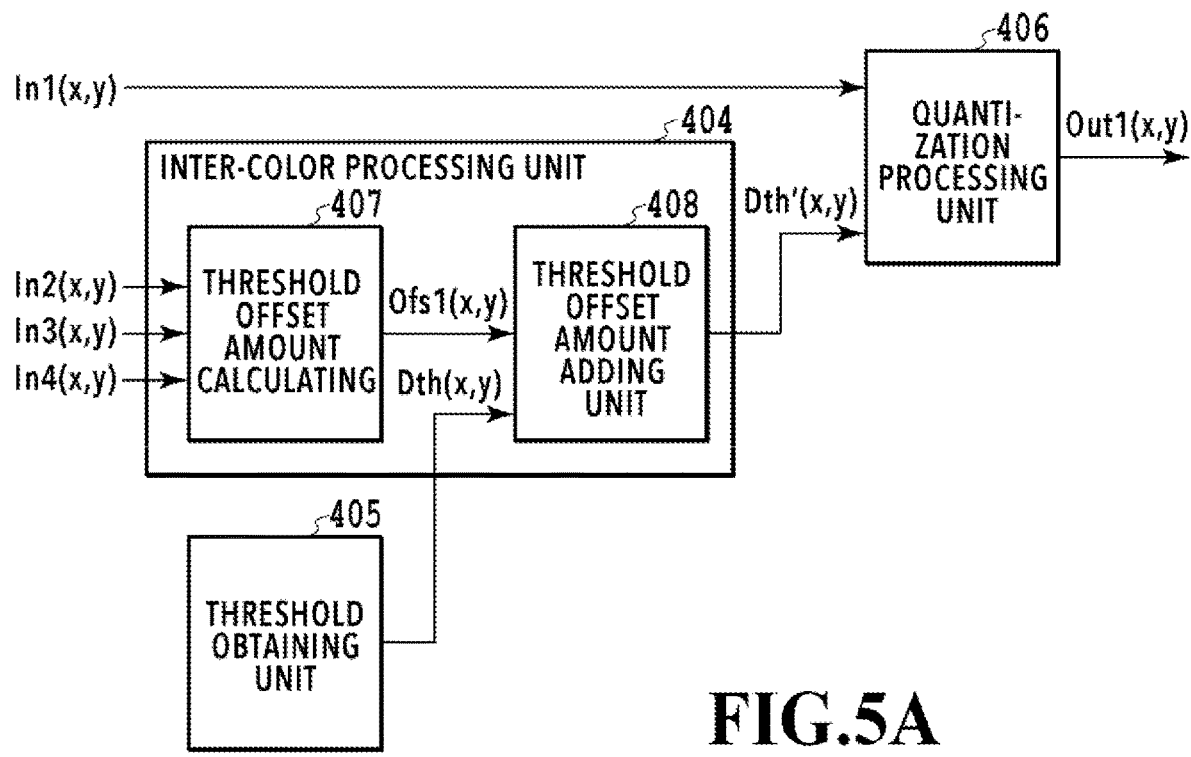
FIGS. 5A and 5B are a block diagram and a flowchart for explaining inter-color processing.
Figure 9:
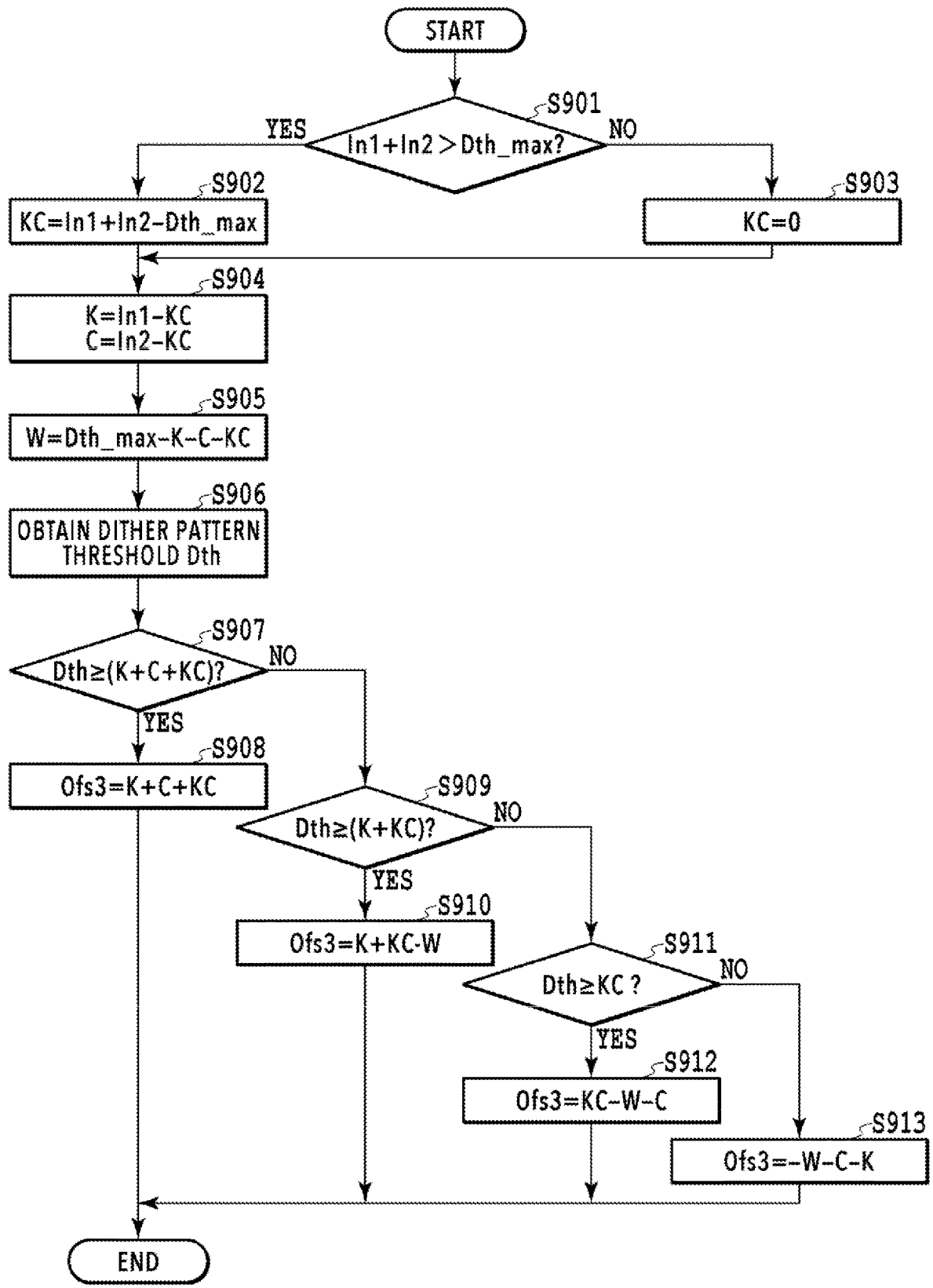
FIG. 9 is a flowchart for explaining a method of deriving an offset value of the third color.

FIG. 9 is a flowchart for explaining a method of deriving the offset value Ofs3 of the third color in the inter-color processing of the embodiment. This processing corresponds to the processing executed by the threshold offset amount calculating unit 407 (see FIG. 5A) in S503 of FIG. 5B. In the following processing, in order to simplify the description, the pixel position (x, y) is omitted unless it is necessary.

In the case where the processing is started, the threshold offset amount calculating unit 407 determines whether the sum of the gradation value In1 of the first color and the gradation value In2 of the second color is greater than the maximum threshold Dth_max (S901). In the case where the sum is greater than the maximum threshold Dth_max, the processing proceeds to S902. In the case where the sum is not greater than the maximum threshold Dth_max, the processing proceeds to S903.

In S902 and S903, the threshold offset amount calculating unit 407 calculates the number KC of thresholds according to which the quantized values of the first and second colors are set to printing (1) in the entire threshold region (0 to Dth_max). Specifically, $KC=In1+In2-Dth\_max$ in S902, and $KC=0$ in S903.

In S904, the threshold offset amount calculating unit 407 calculates: the number K of thresholds according to which the quantized value of the first color is set to (1) while the quantized value of the second color is set to (0); and the number C of thresholds according to which the quantized value of the second color is set to (1) while the quantized value of the first color is set to (0), in the entire threshold region (0 to Dth_max).

$K=In1-KC$ $C=In2-KC$

In S905, the threshold offset amount calculating unit 407 calculates the number W of thresholds according to which the quantized values of the first and second colors are set to non-printing (0) in the entire threshold region (0 to Dth_max).

$W=Dth\_max-K-C-KC$

In S906, the threshold offset amount calculating unit 407 obtains the threshold Dth for the gradation values In3(x, y) of the third color at the coordinates (x, y).

In S907, the threshold offset amount calculating unit 407 determines whether the obtained threshold Dth is (K+C+KC) or greater. In the case where Dth is (K+C+KC) or greater in S907, the processing proceeds to S908 and the threshold offset amount calculating unit 407 calculates the threshold offset value Ofs3 of the third color according to (Formula 4-1).

$$Ofs3=K+C+KC \qquad \text{(Formula 4-1)}$$

In the case where Dth is smaller than (K+C+KC) in S907, the processing proceeds to S909 and the threshold offset amount calculating unit 407 determines whether the threshold Dth is (K+KC) or greater. In the case where Dth is (K+KC) or greater in S909, the processing proceeds to S910 and the threshold offset amount calculating unit 407 calculates the threshold offset value Ofs3 of the third color according to (Formula 4-2).

$$Ofs3=K+KC-W \qquad \text{(Formula 4-2)}$$

In the case where Dth is smaller than (K+KC) in S909, the processing proceeds to S911 and the threshold offset amount calculating unit 407 determines whether the threshold Dth is KC or greater. In the case where Dth is KC or greater in S911, the processing proceeds to S912 and the threshold offset amount calculating unit 407 calculates the threshold offset value Ofs3 of the third color according to (Formula 4-3).

$$Ofs3=KC-W-C \qquad \text{(Formula 4-3)}$$

In the case where Dth is smaller than KC in S911, the processing proceeds to S913 and the threshold offset amount calculating unit 407 calculates the threshold offset value Ofs3 of the third color according to (Formula 4-4).

$$Ofs3=-W-C-K \qquad \text{(Formula 4-4)}$$

Figure 5B:
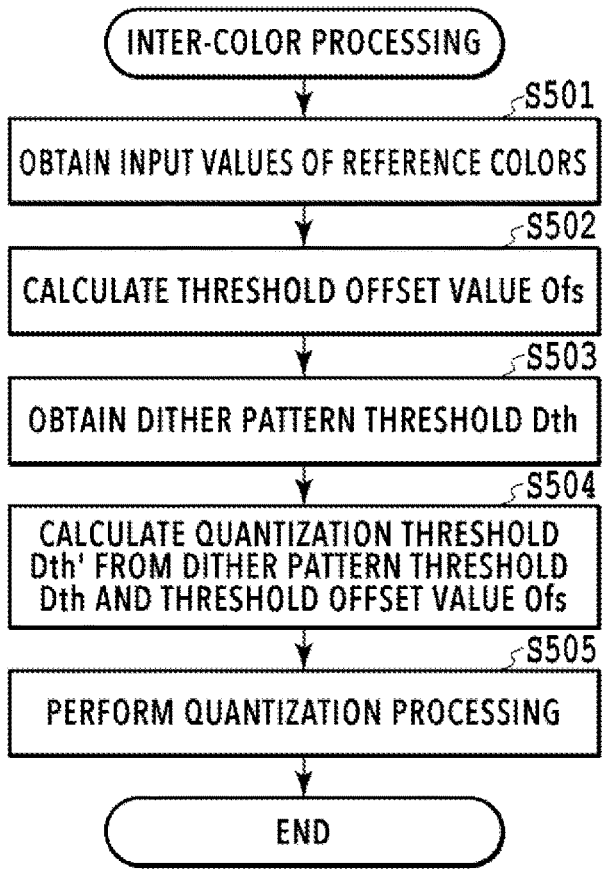

The processing is thus completed. The calculated threshold offset value Ofs3 of the third color is provided to the threshold offset amount adding unit 408 (see FIG. 5A) and the processing of S504 and beyond in FIG. 5B is performed.

In FIG. 9, the case where the offset value Ofs3 is obtained in S908 is the case where the offset value Ofs3 is set such that the third color is set to printing (1) in the region where the first and second colors are set to non-printing (0) as in the first priority region of FIG. 7A. Moreover, the case where the offset value Ofs3 is obtained in S910 is the case where the offset value Ofs3 is set such that the third color is set to printing (1) in the region where only the second color is set to printing (1) as in the second priority region of FIG. 7A and the first priority region of FIG. 7B. Furthermore, the case where the offset value Ofs3 is obtained in S912 is the case where the offset value Ofs3 is set such that the third color is set to printing (1) in the region where only the first color is set to printing (1) as in the third priority region of FIG. 7A and the second priority region of FIG. 7B. Moreover, the case where the offset value Ofs3 is obtained in S914 is the case where the offset value Ofs3 is set such that the third color is set to printing (1) in the region where the first and second colors are both set to printing (1).

As described above, in the determination steps and the steps of setting the offset value Ofs3 in S907 to S913, the quantization processing for magenta being the third color can be performed according to the order of priority as described in FIGS. 7A and 7B. As a result, it is possible suppress unevenness on the print medium and output an image with excellent rub-fastness.

Figure 10A:
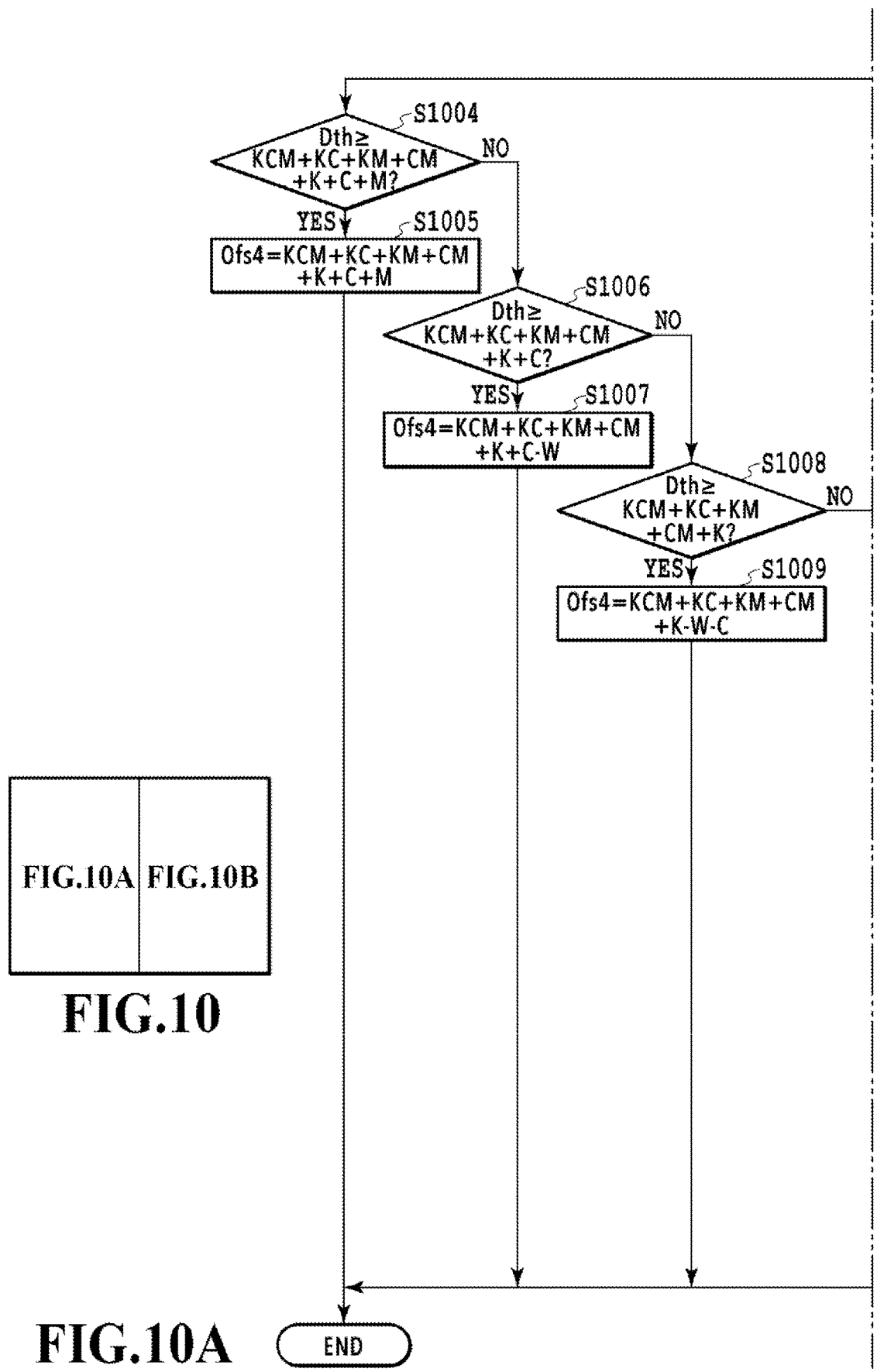
FIG. 10A is a flowchart for explaining a method of deriving an offset value of the fourth color.
Figure 10B:
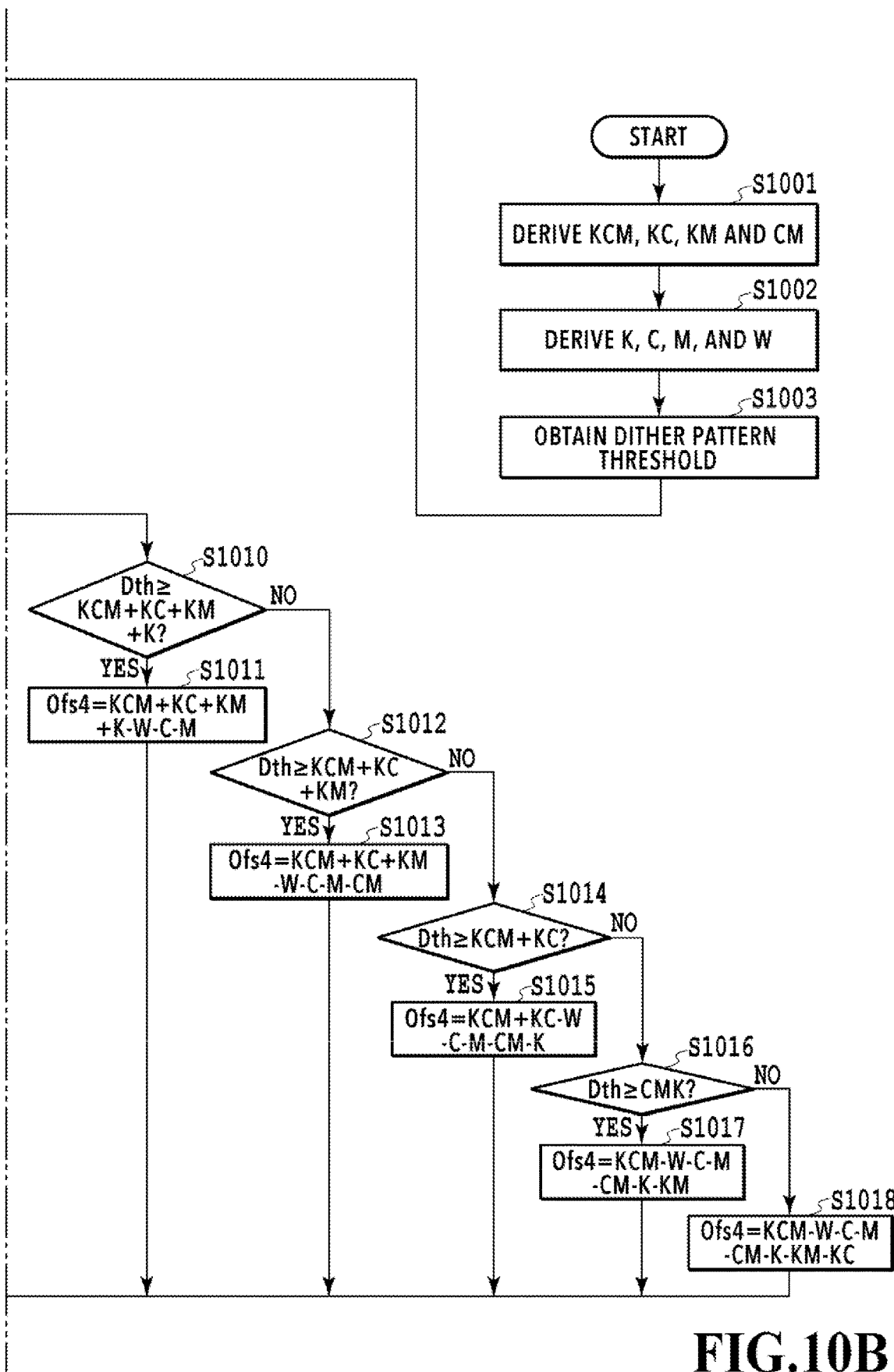
FIG. 10B is a flowchart for explaining a method of deriving an offset value of the fourth color.

FIGS. 10A and 10B are flowcharts for explaining a method of deriving the offset value Ofs4 of the fourth color in the inter-color processing of the embodiment. This processing also corresponds to the processing executed by the threshold offset amount calculating unit 407 (see FIG. 5A) in S503 of FIG. 5B.

In the case where the processing is started, in S1001, the threshold offset amount calculating unit 407 derives KCM, KC, KM, and CM according to the following formulae by using the gradation value In1 of the first color, the gradation value In2 of the second color, and the gradation value In3 of the third color.

$$KCM=\max(In1+In2+In3-2\times D\text{th\_max},0)$$

$$KC=\max(In1+In2-KCM-D\text{th\_max},0)$$

$$KM=\max(In1+In3-KCM-D\text{th\_max},0)$$

$$CM=\max(In1+In2+In3-2\times KCM-KC-KM-D\text{th\_max},0)$$

In this case, KCM is the number of thresholds according to which the quantized values of the first, second, and third colors are all set to printing (1) in the entire threshold region (0 to Dth_max). Moreover, KC is the number of thresholds according to which the quantized values of the first and second colors are set to printing (1) and the quantized value of the third color is set to non-printing (0) in the entire threshold region (0 to Dth_max). Furthermore, KM is the number of thresholds according to which the quantized values of the first and third colors are both set to printing (1) and the quantized value of the second color is set to non-printing (0) in the entire threshold region (0 to Dth_max). Moreover, CM is the number of thresholds according to which the quantized values of the second and third colors are set to printing (1) and the quantized value of the first color is set to non-printing (0) in the entire threshold region (0 to Dth_max). Furthermore, "max (X, Y)" is a function which returns a greater one of the two parameters X and Y.

In S1002, the threshold offset amount calculating unit 407 calculates K, C, M, and W according to the following formulae by using KCM, KC, KM, and CM obtained in S1001. In this case, K is the number of thresholds according to which the quantized value of the first color (black) is set to (1) and the quantized values of the second color (cyan) and the third color (magenta) are set to (0) in the entire threshold region (0 to Dth_max). C is the number of thresholds according to which the quantized value of the second color is set to (1) and the quantized values of the first and third colors are set to (0) in the entire threshold region (0 to Dth_max). M is the number of thresholds according to which the quantized value of the third color is set to (1) and the quantized values of the first and second colors are set to (0) in the entire threshold region (0 to Dth_max). W is the number of thresholds according to which the quantized values of the first, second, and third colors are set to non-printing (0) in the entire threshold region (0 to Dth_max).

$$K=In1-KCM-KC-KM$$

$$C=In2-KCM-KC-CM$$

$$M=In3-KCM-KM-CM$$

$$W=D\text{th\_max}-KCM-KC-KM-K-C-M$$

In S1003, the threshold offset amount calculating unit 407 obtains the threshold Dth for the gradation value In4(x, y) of the fourth color at the coordinates (x, y). The offset value Ofs4 of the fourth color is calculated according to the favorable order of priority from the threshold region divided into eight types by the steps of S1004 to S1018. The processing is thus completed.

Thereafter, the calculated threshold offset value Ofs4 of the fourth color is provided to the threshold offset amount adding unit 408, the processing of S504 and beyond is performed, and the quantization threshold Out4 of the fourth color is derived. According to the aforementioned flowchart, the region in which the quantized values of all three colors of the first to third colors are set to non-printing (0) is set to have the highest priority in the entire threshold region (0 to Dth_max) (S1005). Moreover, regions in which the first color (black) and the third color (magenta) are set to non-printing (0) among the threshold regions in which the second color (cyan) is set to printing (1) are set to have the next highest priorities. Furthermore, regions in which the first color (black) and the third color (magenta) are set to printing (1) among the threshold regions in which the second color (cyan) is set to printing (1) are set to have the next highest priorities. Then, regions in which the quantized values of the first to third colors are all set to printing (1) are set to have the lowest priority (S1018).

Although the case where the quantization thresholds Dth' are obtained and the quantized values are generated for the first, second, third, and fourth colors in this order is described above, the quantization processing can be performed in parallel for the aforementioned four colors. This is because, although the quantization threshold Dth' of each color is obtained by using the gradation values (In1 to In4) of the other colors, the quantization threshold Dth' is obtained without using the quantized values (Out1 to Out4) of the other colors.

Moreover, the first color may be magenta or yellow as long as it is possible to set an ink with relatively high surface tension as the first color and set an ink with relatively low surface tension as the second color. However, in the case where the threshold matrix with blue noise characteristics is used, an effect of suppressing the graininess in the entire image can be obtained by setting black whose graininess is most obvious as the first color. Accordingly, the black ink is set as the first color in this embodiment.

Furthermore, although description is given above of the example in which the surface tension of the cyan ink is lower than the surface tension of the other inks, the ink with low surface tension may be any of the inks of the other colors. In any case, the effect of improving the rub-fastness of the outputted image can be obtained by performing the aforementioned characteristic inter-color processing with an ink with relatively low surface tension set as the second color.

According to the aforementioned embodiment, in the configuration in which the gradation values of the respective ink colors used in the printing apparatus are quantized by using the inter-color processing, the first color in the inter-color processing is set to the ink with the relatively high surface tension and the second color in the inter-color processing is set to the ink with the relatively low surface tension. Then, for the third color and beyond, the offset values Ofs of the respective ink colors in the inter-color processing are set such that the pixel positions at which printing (1) is set for one of any two inks which have a small surface tension difference differ as much as possible from the pixel positions at which printing (1) is set for the other ink. This suppresses the formation of the overlapping dots formed by the inks with high surface tension and reduces the unevenness on the print medium and an image with excellent rub-fastness can be outputted.

Second Embodiment

Also in this embodiment, as in the first embodiment, image processing is performed in the steps illustrated in FIG. 3 by using the printing apparatus 100 and the image processing apparatus 200 illustrated in FIGS. 1 and 2. However, the print head 102 of the embodiment can eject five inks including an ink of gray (Gr) in addition to the inks of black (K), cyan (C), magenta (M), and yellow (Y) described in the first embodiment. In this case, the gray ink is assumed to have relatively high surface tension which is equivalent to those of the black (K), magenta (M), and yellow (Y) inks.

In the inter-color processing of the embodiment, two threshold matrixes different from each other are prepared for the aforementioned inks of five colors and two lines of inter-color processing is performed. Specifically, for black, cyan, and magenta, the inter-color processing using a first threshold matrix is performed with the first color being black, the second color being cyan, and the third color being magenta. Hereafter, such inter-color processing is referred to as first inter-color processing. Meanwhile, for yellow and gray, the inter-color processing using a second threshold matrix is performed with the first color being gray and the second color being yellow. Hereafter, such inter-color processing is referred to as second inter-color processing.

In the first inter-color processing, the same processing as the inter-color processing for the first to third colors in the first embodiment is performed. Specifically, the offset value Ofs1 of the first color (black) is obtained according to (Formula 1-1) and the offset value Ofs2 of the second color (cyan) is obtained according to (Formula 1-2). Moreover, the offset value Ofs3 of the third color (magenta) is obtained by using (Formula 4-1) to (Formula 4-4) according to the flowchart illustrated in FIG. 9.

Meanwhile, in the second inter-color processing, the same processing as the inter-color processing for the first and second colors in the first embodiment is performed. Specifically, the offset value Ofs1 of the first color (gray) is obtained according to (Formula 1-1) and the offset value Ofs2 of the second color (yellow) is obtained according to (Formula 1-2). The first threshold matrix and the second threshold matrix are threshold matrixes different from each other but both have blue noise characteristics.

Figure 11A:
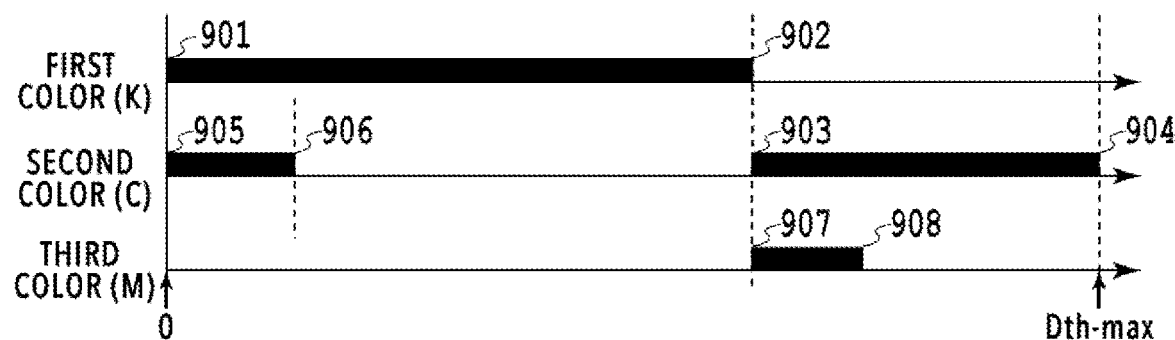
FIGS. 11A and 11B are graphs illustrating a result of first quantization processing and a result of second quantization processing, respectively.
Figure 11B:
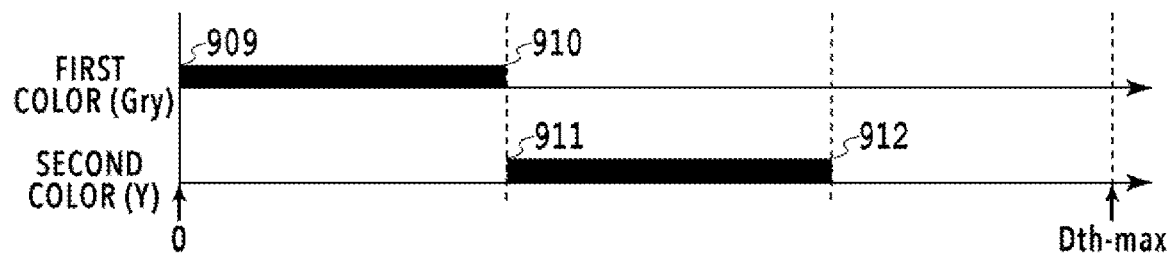

FIGS. 11A and 11B are graphs illustrating a result of the aforementioned first inter-color processing and a result of the aforementioned second inter-color processing, respectively. In the first inter-color processing illustrated in FIG. 11A, the same processing as the inter-color processing for the first to third colors in the first embodiment is performed.

Accordingly, the third color (magenta) is set to printing (1) preferentially in a region (903 to Dth_max) in which the first color (black) and the second color (cyan) are set to non-printing (0). Meanwhile, in the second inter-color processing illustrated in FIG. 11B, the same processing as the inter-color processing for the first and second colors in the first embodiment is performed. Accordingly, the second color (yellow) is set to printing (1) preferentially in a region (910 to Dth_max) in which the first color (gray) is set to non-printing (0).

According to the embodiment, the two types of threshold matrixes with blue noise characteristics are prepared and the black ink and the gray ink whose graininess is relatively obvious are each set as the first color in the inter-color processing therefor. In this state, the offset values Ofs are set such that the inks with high surface tension such as the black ink and the magenta ink are avoided to be set to printing (1) in the same pixel region as much as possible. According to such an embodiment, it is possible to output an image with excellent rub-fastness while suppressing graininess.

In the aforementioned inter-color processing, the threshold Dth is offset by using the calculated offset value Ofs(x, y) to obtain the quantization threshold Dth'(x, y), the obtained quantization threshold Dth'(x, y) is compared with the gradation value In, and printing (1) or non-printing (0) is set depending on the magnitude relationship between the quantization threshold Dth'(x, y) and the gradation value In. However, the calculated offset value Ofs (x, y) may be used to offset the gradation value In instead of the threshold Dth. Specifically, the same result can be obtained by adding the calculated offset value Ofs (x, y) to the gradation value In (x, y) to obtain a new gradation value In' (x, y) and comparing the new gradation value In' (x, y) with the threshold Dth. In any case, it is only necessary to change the difference between the threshold Dth and the gradation value In based on the calculated offset value Ofs (x, y) and compare the threshold Dth and the gradation value In in the relationship after the changing of the difference.

OTHER EMBODIMENTS

Although the quantization processing using the inter-color processing is described above, the printing of the inks with the same level of surface tension in the same pixel region can be avoided also in the case where, for example, an error diffusion method is employed.

Specifically, first, the quantization processing for the first color with high surface tension is performed by performing normal error diffusion processing. Next, the quantization processing for the second color with lower surface tension than the first color is performed. In this case, for a pixel for which the quantized value of the first color is already set to printing (1), the threshold is corrected to be set to a larger value. Then, in the case where the quantization processing for the third color is performed, for the pixel for which the quantized value of the first color is already set to printing (1), the threshold is corrected to an even larger value. This can reduce frequency of occurrence of the case where the quantized values of the first color and the third color are both set to printing (1) in the same pixel and suppress overlapping of the inks with high surface tension on the print medium. However, in this example, since the quantization for the second color and beyond is performed based on the result of the quantization processing of the preceding color, the quantization processing cannot be performed in parallel for four colors as in the aforementioned embodiments.

Moreover, whether the aforementioned quantization processing is to be employed or not may be determined depending on the attributes of the image data. For example, for image data to which attribute information of characters and line drawings is added, an image in which priority is given to rub-fastness may be outputted by performing the inter color processing to suppress the overlapping of the inks with high surface tension as described above. Meanwhile, for image data to which attribute information of a photograph image is added, an image in which priority is given to coloring property may be outputted by employing, for example, general error diffusion processing or the like.

In the aforementioned embodiment, description is given of the quantization processing performed to minimize overlapping of the third color (magenta) and the first color (black). However, in order to improve the resistance (robustness) of an image against density variation occurring with, for example, misalignment between a black nozzle row and a magenta nozzle row, it is sometimes preferable that there are some pixels for each of which the quantized values of the first and third colors are both set to printing (1). The rub-fastness can be improved even if the pixels for each of which the first and third colors are both set to printing (1) are present, as long as the number of pixels for which the first color is set to non-printing (0) is greater than the number of pixels for which the first color is set to printing (1) among pixels for which the third color is set to printing (1). The number of such pixels can be adjusted by adding a random number of a certain magnitude to the offset value Ofs. Specifically, adjusting the number of pixels for each of which the quantized values of the first and third colors are both set to printing (1) enables output of an image in which the balance between the rub-fastness and the robustness is favorably maintained.

Moreover, although the serial inkjet printing apparatus is described above as an example by using FIGS. 1A and 1B, the present invention can be applied also to a full-line type inkjet printing apparatus.

Moreover, the used ink colors are not limited to the ink colors described in the aforementioned embodiments. For example, a light cyan ink and a light magenta ink with high lightness can be used in addition to the cyan ink and the magenta ink. Moreover, inks of particular colors such as red, green, and blue may be used. Moreover, these multiple inks may include both of pigment inks and dye inks. In any case, the rub-fastness of the outputted image can be improved as long as the quantization processing can be performed such that, for the combination of the inks which have a small surface tension difference, the number of pixels for each of which the quantized values of the inks are both set to printing (1) is minimized.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-077339 filed Apr. 15, 2019, which is hereby incorporated by reference wherein in its entirety.

What is claimed is:

1. An image processing method comprising:
an obtaining step of obtaining a first gradation value for a first coloring material, a second gradation value for a second coloring material, and a third gradation value for a third coloring material for each pixel; and
a generation step of generating a first quantized value indicating applying or non- applying of the first coloring material by quantizing the first gradation value, generating a second quantized value indicating applying or non-applying of the second coloring material by quantizing the second gradation value, and generating a third quantized value indicating applying or non-applying of the third coloring material by quantizing the third gradation value, for each pixel,
the first, second and third quantized value being used for printing an image on a print medium by using an applying unit which can apply the first coloring material based on the first quantized value, apply the second coloring material based on the second quantized value, and apply the third coloring material based on the third quantized value,
wherein a surface tension difference between the first coloring material and the third coloring material is smaller than a surface tension difference between the first coloring material and the second coloring material, and
wherein in a case where the first gradation values obtained in the obtaining step for a plurality of pixels included in a predetermined region are same, the second gradation values obtained in the obtaining step for the plurality of pixels are same, and the third gradation values obtained in the obtaining step for the plurality of pixels are same,
the first quantized values, the second quantized values, and the third quantized values are generated such that, in the predetermined pixel region, the number of pixels for each of which the second quantized value indicates applying the second coloring material and the third quantized value indicates applying the third coloring material is greater than the number of pixels for each of which the first quantized value indicates applying the first coloring material and the third quantized value indicates applying the third coloring material.

2. The image processing method according to claim 1, wherein, in the generation step, the first quantized value is generated by comparing the first gradation value with a first threshold stored in a threshold matrix, the second quantized value is generated by comparing the second gradation value with a second threshold obtained by correcting the first threshold based on the first gradation value, the third quantized value is generated by comparing the third gradation value with a third threshold obtained by correcting the first threshold based on the first gradation value and the second gradation value.

3. The image processing method according to claim 2, wherein, in the generation step, the second threshold is obtained by subtracting the first gradation value from the first threshold and the third threshold is obtained by subtracting the first gradation value and the second gradation value from the first threshold.

4. The image processing method according to claim 2, wherein
in the obtaining step, a fourth gradation value for a fourth coloring material and a fifth gradation value for a fifth coloring material, which are different from the first coloring material, the second coloring material, and the third coloring material are further obtained for each pixel,
in the generation step, a fourth quantized value indicating applying or non-applying of the fourth coloring material is generated by comparing the fourth gradation value with a fourth threshold stored in a second threshold matrix different from the threshold matrix and a fifth quantized value indicating applying or non-applying of the fifth coloring material is generated by comparing the fifth gradation value with a fifth threshold obtained by correcting the fourth threshold based on the fourth gradation value.

5. The image processing method according to claim 1, wherein, in the generation step, the first quantized value is generated by comparing the first gradation value with a threshold stored in a threshold matrix, the second quantized value is generated by comparing a value, obtained by correcting the second gradation value based on the first gradation value, with the threshold, and the third quantized value is generated by comparing a value, obtained by correcting the third gradation value based on the first gradation value and the second gradation value, with the threshold.

6. The image processing method according to claim 2, wherein the threshold matrix has blue noise characteristics.

7. The image processing method according to claim 1, wherein
in the generation step,
the first quantized value is generated by quantizing the first gradation value, the second quantized value is generated by quantizing the second gradation value, and the third quantized value is generated by quantizing the third gradation value respectively by using error diffusion processing, and
a threshold to be used to quantize the second gradation value is corrected based on the first quantized value and a threshold to be used to quantize the third gradation value is corrects based on the first quantized value and the second quantized value.

8. The image processing method according to claim 1, wherein the first coloring material is black ink, the second coloring material is cyan ink, and the third coloring material is magenta ink.

9. The image processing method according to claim 1, wherein the first coloring material and the third coloring material are pigment inks and the second coloring material is a dye ink.

10. The image processing method according to claim 1 further comprising the applying step using the applying unit.

11. The image processing method according to claim 1, wherein a surface tension of the first coloring material is higher than a surface tension of the second coloring material, and a surface tension of the third coloring material is higher than the surface tension of the second coloring material.

12. An image processing apparatus comprising:
an obtaining unit configured to obtain a first gradation value for a first coloring material, a second gradation value for a second coloring material, and a third gradation value for a third coloring material, for each pixel; and
a generating unit configured to generate a first quantized value indicating applying or non-applying of the first coloring material by quantizing the first gradation value, to generate a second quantized value indicating applying or non-applying of the second coloring material by quantizing the second gradation value, and to generate a third quantized value indicating applying or non-applying of the third coloring material by quantizing the third gradation value, for each pixel,
the first, second and third quantized value being used for printing an image on a print medium by using an applying unit which can apply the first coloring material based on the first quantized value, apply the second coloring material based on the second quantized value, and apply the third coloring material based on the third quantized value,
wherein a surface tension difference between the first coloring material and the third coloring material is smaller than a surface tension difference between the first coloring material and the second coloring material, and
wherein in a case where the first gradation values obtained by the obtaining unit for a plurality of pixels included in a predetermined region are same, the second gradation values obtained by the obtaining unit for the plurality of pixels are same, and the third gradation values obtained by the obtaining unit for the plurality of pixels are same,
the generation unit generates the first quantized values, the second quantized values and the third quantized values such that, in the predetermined pixel region, the number of pixels for each of which the second quantized value indicates applying the second coloring material and the third quantized value indicates applying the third coloring material is greater than the number of pixels for each of which the first quantized value indicates applying the first coloring material and the third quantized value indicates applying the third coloring material.

13. An image processing method comprising
a generation step of generating a first quantized value by comparing a first gradation value for a first coloring material with a threshold for the pixel in a threshold matrix, generating a second quantized value by quantizing a second gradation value for a second coloring material, and generating a third quantized value by quantizing a third gradation value for a third coloring material, for each pixel,
the first, second and third quantized value being used for printing an image on a print medium by using an applying unit which can apply the first coloring material based on the first quantized value, apply the second coloring material based on the second quantized value, and apply the third coloring material based on the third quantized value, wherein a surface tension difference between the first coloring material and the third coloring material is smaller than a surface tension difference between the first coloring material and the second coloring material, in the generation step, the second quantized value is generated based on the first gradation value, the second gradation value, and the threshold used in the comparison with the first gradation value and not based on the third gradation value, in a case where a sum of the first gradation value and the second gradation value is smaller than a maximum value of thresholds arranged in the threshold matrix, at least one of the third gradation value or the threshold used in the comparison with the first gradation value is changed based on the first gradation value and the second gradation value and the third quantized value is generated based on a combination of the threshold and the third gradation value after the change, and in a case where the sum of the first gradation value and the second gradation value is greater than the maximum value of the thresholds arranged in the threshold matrix, at least one of the third gradation value or the threshold used in the comparison with the first gradation value is changed based on the first gradation value and the third quantized value is generated based on a combination of the threshold and the third gradation value after the change.

14. The image processing method according to claim 13, wherein, for a plurality of pixels included in a predetermined pixel region, the first gradation values are the same uniformly, the second gradation values are the same uniformly, and the third gradation values are the same uniformly, in the generation step, the second quantized values and the third quantized values are generated such that, in the predetermined pixel region, the number of pixels for each of which the second quantized value indicates applying the second coloring material and the third quantized value indicates applying the third coloring material is greater than the number of pixels for each of which the first quantized value indicates applying the first coloring material and the third quantized value indicates applying the third coloring material.

15. The image processing method according to claim 13, wherein in a case where a sum of the first gradation value and the second gradation value is smaller than a maximum value of thresholds arranged in the threshold matrix, a sum of the first gradation value, the second gradation value, and a third gradation value is greater than the maximum value of the thresholds arranged in the threshold matrix, and in a case where the sum of the first gradation value and the second gradation value is greater than the maximum value of the thresholds arranged in the threshold matrix, a sum of the first gradation value and the third gradation value is greater than the maximum value of the thresholds arranged in the threshold matrix.

16. The image processing method according to claim 13, wherein, in the generation step, for each pixel, a fourth quantized value is generated by comparing a fourth gradation value for a fourth coloring material with a threshold for the pixel in a second threshold matrix different from the threshold matrix and a fifth quantized value is generated based on the fourth gradation value, a fifth gradation value for a fifth coloring material, and the threshold used in the comparison with the fourth gradation value.

17. The image processing method according to claim 13, wherein the threshold matrix has blue noise characteristics.

18. An image processing method for printing an image on a print medium by using an applying unit configured to apply a first coloring material according to a first quantized value, apply a second coloring material according to a second quantized value, and apply a third coloring material according to a third quantized value, the image processing method comprising:

a generation step of generating the first quantized value by quantizing a first gradation value for the first coloring material, generating the second quantized value by quantizing a second gradation value for the second coloring material, and generating the third quantized value by quantizing a third gradation value for the third coloring material, for each pixel, wherein a surface tension difference between the first coloring material and the third coloring material is smaller than a surface tension difference between the first coloring material and the second coloring material, and wherein in the generation step, the first quantized value is generated by comparing the first gradation value with a threshold for a pixel in a threshold matrix, the second quantized value is generated based on the first gradation value, the second gradation value, and the threshold used in the comparison with the first gradation value and not based on the third gradation value, in a case where a sum of the first gradation value and the second gradation value is smaller than a maximum value of thresholds arranged in the threshold matrix, the third quantized value is generated by comparing the third gradation value with value obtained by subtracting the first gradation value and the second gradation value from the threshold used in the comparison with the first gradation value, and in a case where the sum of the first gradation value and the second gradation value is greater than the maximum value of the thresholds arranged in the threshold matrix, the third quantized value is generated by comparing the third gradation value with a value obtained by subtracting the first gradation value from the threshold used in the comparison with the first gradation value.

19. The image processing method according to claim 18, wherein in the generation step, in a case where the value obtained by subtracting the first gradation value and the second gradation value from the threshold used in the comparison with the first gradation value is a negative value, the third gradation value is compared with a value obtained by adding the maximum value of the thresholds arranged in the threshold matrix to the value obtained by subtracting the first gradation value and the second gradation value from the threshold, and in a case where the value obtained by subtracting the first gradation value from the threshold used in the comparison with the first gradation value is a negative value, the third gradation value is compared with a value obtained by adding the maximum value of the thresholds arranged in the threshold matrix to the value obtained by subtracting the first gradation value from the threshold.

\* \* \* \* \*